Patented July 10, 1951

2,560,011

UNITED STATES PATENT OFFICE 2,560,011

RAW FISH TREATING PROCESS

Marcel Trudel, Montreal, Quebec, Canada

No Drawing. Application July 18, 1950,
Serial No. 174,571

11 Claims. (Cl. 99—2)

The present invention relates to a food producing process and more particularly to a fish treating process for the production of fish meal. Fish meal is commonly used as an animal and poultry feed and also as manure.

According to one conventional method, fish meal is prepared by simply dehydrating, pressing and pulverizing the whole fish and/or fish waste and the like and preferably with the use of vacuum or centrifugal means.

According to another better method, the fish material is steamed, dried, pressed and then pulverized to obtain the desired product.

The above mentioned processes are long and tedious and require expensive equipment. Furthermore, because no separation of the various constituents of the fish material is contemplated, valuable fish by-products are lost.

It has been found also, that fish meal, produced according to any of the above mentioned processes, is very hygroscopic because of the presence of fish glue therein, which absorbs water. Therefore, special precautions are necessary for the handling of such a material.

It has also been proposed to boil the fish in water prior to the pressing and drying operation in order to activate the disintegration of the fish. But when the fish is placed in warm water and digested, a pasty product is obtained which is very hard to separate from the water, thereby causing great waste of fish material.

According to the process of the present invention, the gelatin contained in the raw fish is separated along with other valuable materials from the fish fibers which latter are then dried and powdered for obtaining fish meal.

The above mentioned separation is effected by dissolving the gelatin or fish glue in acidified water.

According to the present invention, it has been found that if the pH of the fish and water mixture is suitably adjusted, upon digesting this mixture at a relatively low temperature, the fish is quickly disintegrated, the gelatin or fish glue going into solution, but at the same time the fibers are not dissolved and remain in a substantially solid state in needle-like form without forming a milky or pasty product. It is thus a simple matter to separate the solid residue from the solution and to dry said residue in order to obtain the fish meal according to the invention.

Therefore the main object of the present invention is the provision of a fish treating process for the production of fish meal in a quick and easy manner.

Still another important object, according to the present invention, is the provision of a fish treating process which will be applicable to fat fish material such as mackerel, herring, sardines and the like as well as to fish material having a low concentration of fat such as cod, fresh water fish and the like.

Still another important object, according to the present invention, is the provision of a fish treating process for the production of fish meal, resulting in a product which will be remarkably non-hygroscopic, the humidity percentage of which remaining remarkably constant despite humidity variations in the surrounding air.

Another important object of the present invention is the provision of a fish treating process for the production of fish meal which will permit the easy separation of a number of valuable by-products such as fish glue, relatively pure protein, vitamins and others.

Another important object of the present invention is the provision of a fish treating process for the production of a fish meal product having remarkable keeping qualities.

Another important object of the present invention is the provision of a fish treating process for the production of fish meal, which requires a minimum of equipment and is not expensive to carry out in practice.

Still another important object, according to the present invention, is the provision of a method or process for the production of fish meal, embodying the cooking of the fish prior to the drying operation and characterised by adjustment of the pH of the cooking solution.

The foregoing and other important objects of the present invention will become more apparent during the following disclosure.

According to the invention, whole raw fish and/or raw fish waste and the like is placed in a substantially equal weight of water at a warm temperature but below the boiling point of the same, the pH of the water having been previously adjusted within the pH range of 3 and 3.5 by the addition thereto of a water soluble acid in suitable concentration.

The mixture is then digested from half an hour or less to one hour or more between the temperatures of 50° C. and 80° C.

This digestion causes the solution of the gelatin which is hydrolized into fish glue. The gelatin binds the fibers of the fish together, therefore said fibers are set loose, but are not disintegrated because low water temperatures are employed and because the acid has a somewhat coagulating action on the same.

After the digestion of the mixture, the same is filtered over a relatively coarse mesh screen and the collected solid residue is then very easily and quickly pressed and dried and may thereafter be pulverized by any known means. The resulting dried product constitutes the fish meal according to the invention.

It should be noted that the digested fibers have a needle like form which provides a very good filtering mat easily separated from the water without the use of centrifugal apparatus or the like.

The liquid obtained during the filtrating operation, contains a suspension of protein which quickly settles out and therefore is easily separated from the liquid medium. This protein is very pure (98% and over) and constitutes a valuable by-product of the process according to the present invention.

The screened or filtered waters also contain fish glue which may be easily separated by vacuum evaporation or other known means.

When the fish material is relatively fatty, oil is collected by decantation over the water and fish mixture after digestion of the same. Some oil is also entrained with the screened water and is separated from the same by decantation or other means.

The adjustment of the pH of the water to be added to the fish material is preferably made by the addition of an acid chosen from the group of the lower aliphatic acids and their isomers which are soluble in water even if only in small concentration.

Experimentation has also been carried out with mineral acids such as hydrochloric or phosphoric or like acids; they have been found to disintegrate the fish very rapidly but to give a pasty product which is difficult to filter, press and dry. Moreover, the pure protein in the suspension in the filtrate is more finely divided and is more difficult to separate. It has also been found that with these acids a lower percentage of water is squeezed out of the wet fish cake prior to drying the same.

Very good results have been obtained by acidifying the water with formic acid or acetic acid; a white fibrous product results which is very easy to manipulate during the filtering, pressing and drying operations. Moreover, the pure protein in suspension in the filtrate is very easily separated.

For best results, the pH of the water must be adjusted in the range 3–3.5, the following concentrations of acid being preferably used: acetic acid: 0.3–0.5%; formic acid: 0.1–0.3%.

The following are illustrative examples of the process according to the present invention.

*Example 1.*—One pound of fresh cod fish was mixed with one pound of water acidified to a pH of 3.1 with 0.5 cc. of formic acid (formic acid concentration 0.1% relatively to the weight of water). The mixture was heated at 70° C. for half an hour and then screened and pressed thereby obtaining 21 ozs. of filtrate and 8 ozs. of wet fish cake.

The wet fish cake was then dried giving 3 ozs. of dried fish meal at 4% humidity or a yield of 17% relatively to the weight of fresh fish.

The filtrate carried a suspension of protein which quickly settled down and was separated to give a 0.4 yield of 98% pure protein; 6.5% of fish soluble containing 53% of solid matter was also separated from the filtrate by vacuum evaporation. This fish soluble gave a fish glue of very good quality.

The fish meal obtained was white and fibrous and very easily comminuted.

*Example 2.*—One pound of raw whole cod fish was put in one pound of water at 90° C. and previously acidified at a pH of 3.4 with 2.3 cc. or 0.5% concentration of acetic acid relatively to the weight of water, said solution being at 90° C. The resultant mixture was then digested for three-quarters of an hour at 80° C. and then poured over a screen resulting in the filtration of the fibers of the fish. These fibers were then pressed and dried and thereafter comminuted giving a white fish meal powder.

The protein in suspension in the filtrate quickly settled down and was separated to give a 98% pure protein. Fish glue was also obtained.

Other experiments were similarly carried out using hydrochloric acid in a concentration of 0.02% relative to the weight of water and in which case the fish quickly disintegrated but did give a pasty product which was difficult to filtrate. Phosphoric acid was also used in another experiment to the amount of 0.1 cc. per pound of water giving the same results as the experiment with hydrochloric acid.

Experimentation was also carried out on fish waste giving fish meal containing 67% of protein and 4% humidity.

Obviously, when using whole fish and/or fish waste, the solid residue collected on the screen during the filtration or screening operations may be further passed in a selective screen such as a rotary screen of increasing wire mesh for separating the fish bones from the fish fibers thereby giving a fish meal product of improved quality that is containing a higher percentage of protein.

Experimentation was also carried out on mackerel and herring and it was found out that the fish oils were easily separated along with the filtrate from the fish residue and was easily collected by decantation.

In all cases it appears that the pH of the water serving to the digestion of the fish must be adjusted between 3 and 3.5 for best results. Because extremely good results have been obtained with acetic and formic acid, it appears that the lower aliphatic acids including pentanoic acid, their isomers and their anhydride could be used with comparably good results.

Apart from a considerably simplified and fast procedure over existing methods, the present process has the further advantage of providing valuable by-products which may be easily separated from the filtrate and from one another.

While examples of the fish treating process according to the present invention have been described, it is understood that various modifications may be resorted to without departing from the spirit and scope of the appended claims.

What I claim is:

1. A process for the production of fish meal from raw fish material containing gelatin, comprising the steps of adding water to the fish material, adjusting the pH between 3.0 and 3.5 digesting the resultant mixture at a temperature between 50° and 80° C. filtering the solid residue.

2. A process for the production of fish meal from raw fish material containing gelatin, comprising the steps of adding to the fish material, water containing a water soluble organic acid selected from the group consisting of the lower aliphatic acids and their isomers, said acid being present in such an amount as to have the pH lying between 3.0 and 3.5, digesting the resultant mixture at a temperature between 50° and 80° C.

to dissolve said gelatin, and filtering the solid residue.

3. A process for the production of fish meal from raw fish material containing gelatin, comprising the steps of adding water to the fish material, adjusting the pH of the water and fish mixture by the addition thereto of a water soluble acid in the concentration between 0.01 and 1% relatively to the weight of water, digesting the resultant mixture at a temperature between 50° C. and 80° C. until the gelatin is dissolved, filtering and drying the solid residue.

4. A process for the production of dried fish meal from raw fish material containing gelatin, comprising the steps of adding water to the fish material, the pH of the water being adjusted between 3.0 and 3.5 by the addition of a water soluble acid, digesting the resultant mixture between half an hour and one hour at a temperature comprised between 50° C. and 80° C., filtering and drying the solid residue.

5. A process as claimed in claim 4 wherein the acid is selected from the group of the water soluble lower aliphatic acids and their isomers.

6. A process for the production of fish meal, from raw fish material containing gelatin, comprising the steps of adding water to the fish material, the pH of the water being adjusted between 3 and 3.5 by the addition thereto of a water soluble organic acid, digesting the resultant fish and water mixture at a temperature comprised between 50° C. and 80° C. until the gelatin is dissolved, and filtering and drying the solid residue.

7. A process as claimed in claim 6, wherein the acid is selected from the group comprising the lower aliphatic acids and their isomers.

8. A process as claimed in claim 7, wherein the acid is formic acid.

9. A process as claimed in claim 6, wherein the acid is acetic acid.

10. A process for the production of dried fish meal from raw fish material containing gelatin, comprising the steps of adding water to the fish material in substantially equal weight, the pH of said water having been previously adjusted by the addition thereto of formic acid in a concentration comprised between 0.1 and 0.3%, digesting the resultant fish and water mixture between half an hour and one hour at a temperature comprised between 50° C. and 80° C., filtering, pressing, drying and comminuting the solid residue.

11. A process for the production of dried fish meal from raw fish material containing gelatin, comprising the steps of adding water to the fish material in substantially equal weight, the pH of said water having been previously adjusted by the addition thereto of acetic acid in a concentration comprised between 0.3 and 0.5%, digesting the resultant mixture between half an hour and one hour at a temperature comprised between 50 and 80° C., filtering, pressing, drying and comminuting the solid residue.

MARCEL TRUDEL.

REFERENCES CITED

The following references are of record in the file of this patent:

UNITED STATES PATENTS

| Number | Name | Date |
|---|---|---|
| 1,550,268 | Kramer | Aug. 18, 1925 |
| 2,193,871 | Hanno | Mar. 19, 1940 |
| 2,403,174 | Ernst | July 2, 1946 |
| 2,406,249 | Parfentjev | Aug. 20, 1946 |